June 9, 1953  C. H. BROWN  2,641,071
PLOW AND MOLDBOARD ADJUSTMENT FOR DITCH DIGGING PLOWS
Filed May 19, 1948  4 Sheets-Sheet 1
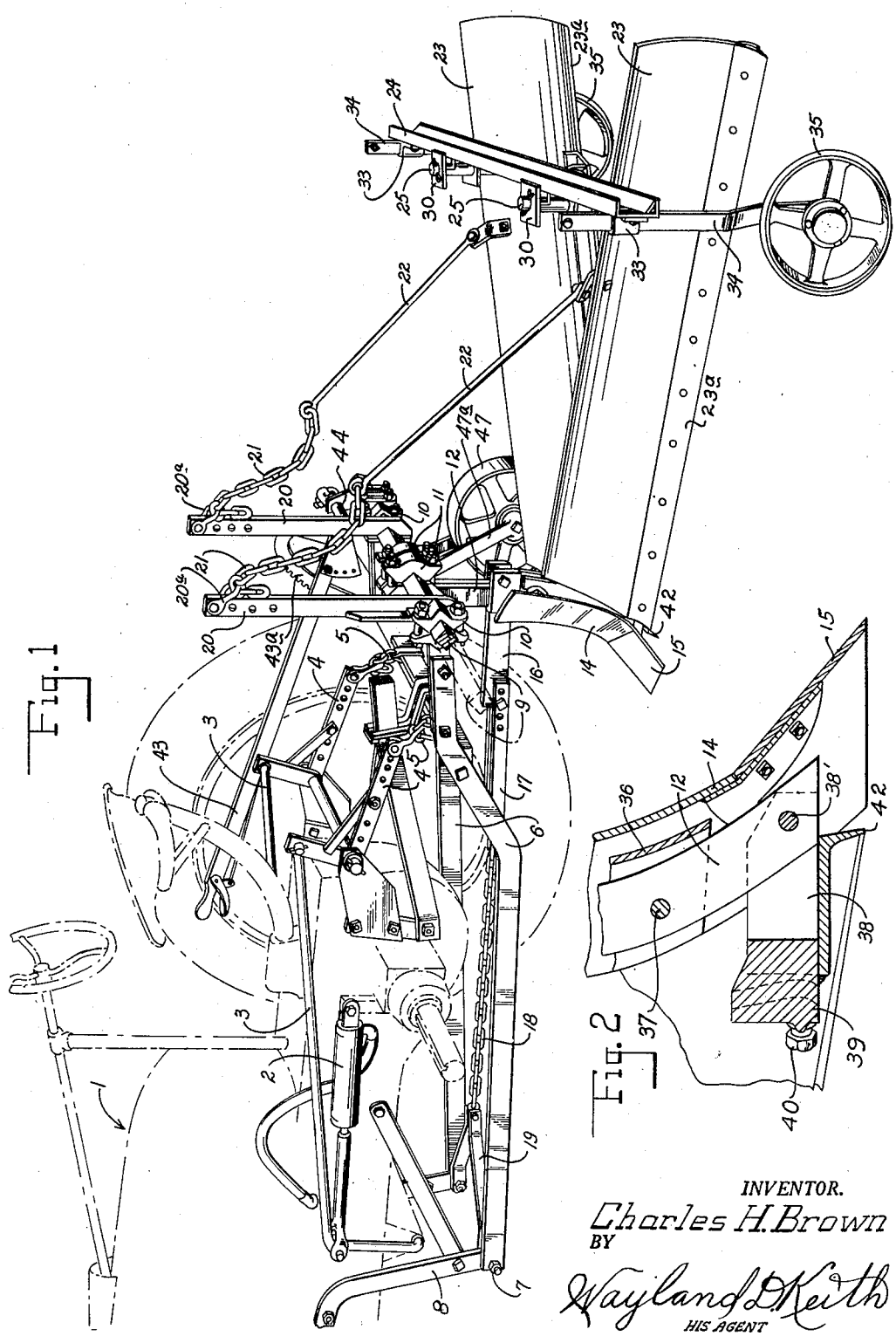
INVENTOR.
Charles H. Brown
BY
Wayland D. Keith
HIS AGENT June 9, 1953  C. H. BROWN  2,641,071
PLOW AND MOLDBOARD ADJUSTMENT FOR DITCH DIGGING PLOWS
Filed May 19, 1948  4 Sheets-Sheet 2
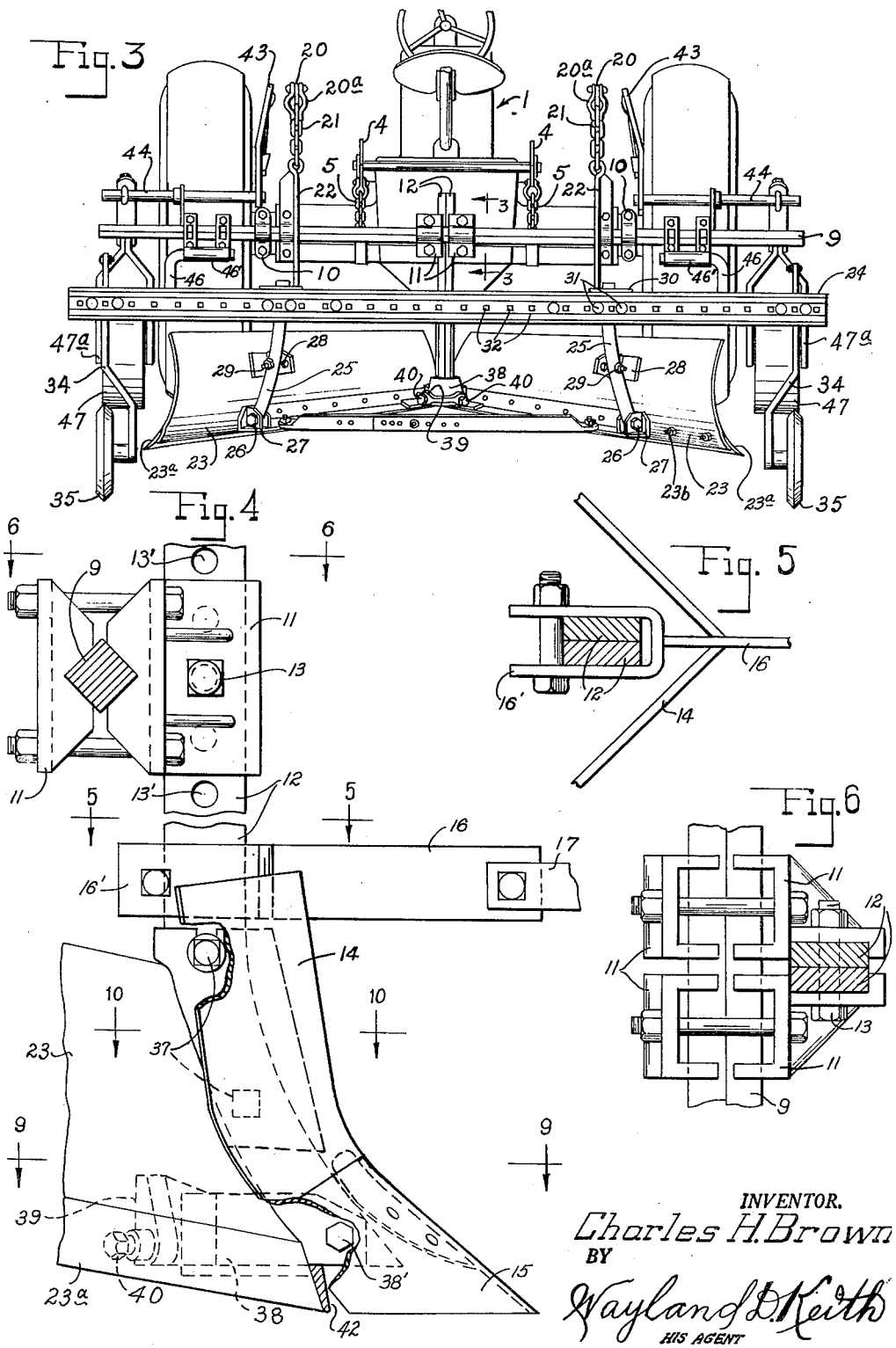
INVENTOR.
Charles H. Brown
BY
Wayland D. Keith
HIS AGENT

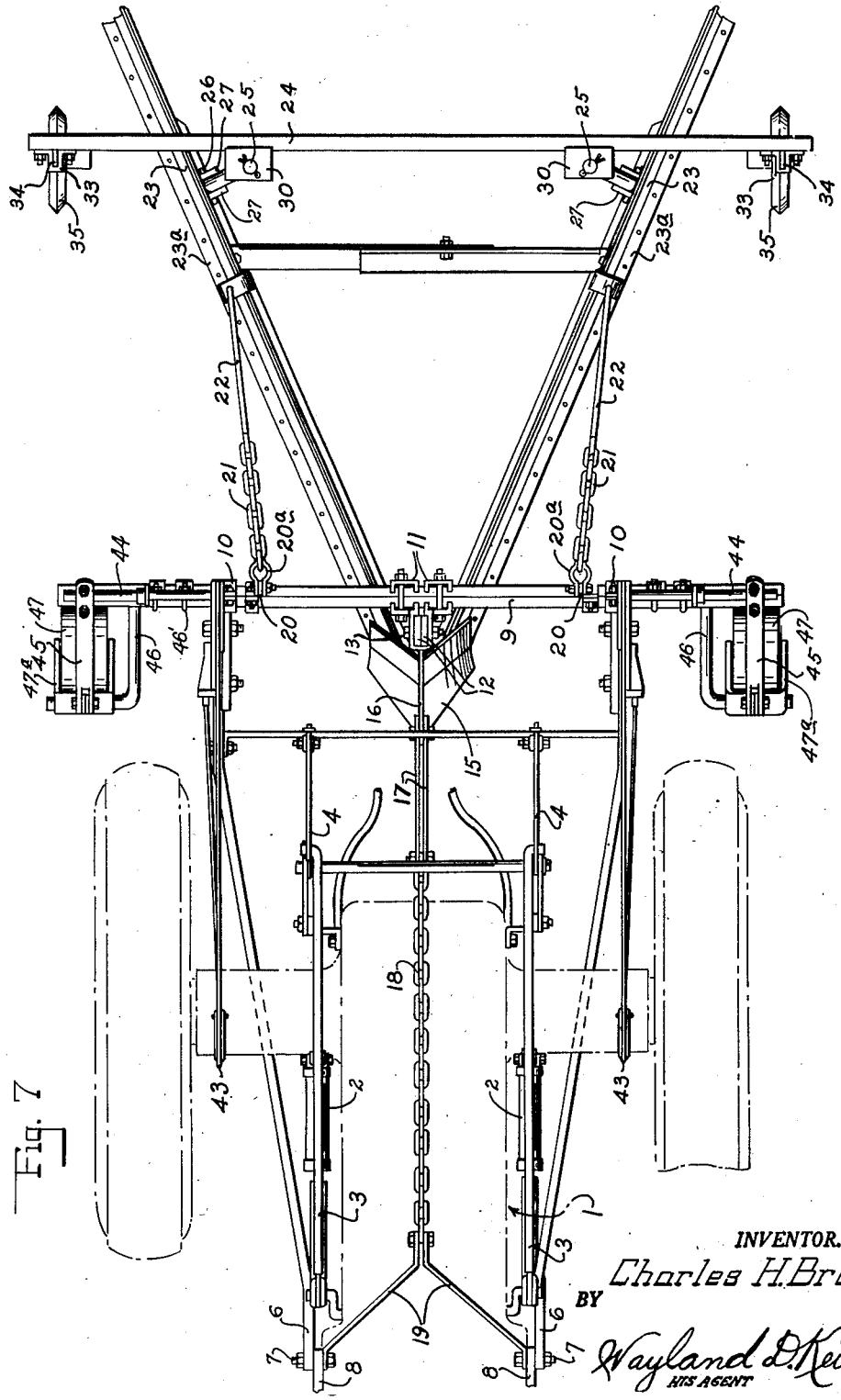

June 9, 1953     C. H. BROWN     2,641,071
PLOW AND MOLDBOARD ADJUSTMENT FOR DITCH DIGGING PLOWS
Filed May 19, 1948     4 Sheets-Sheet 4
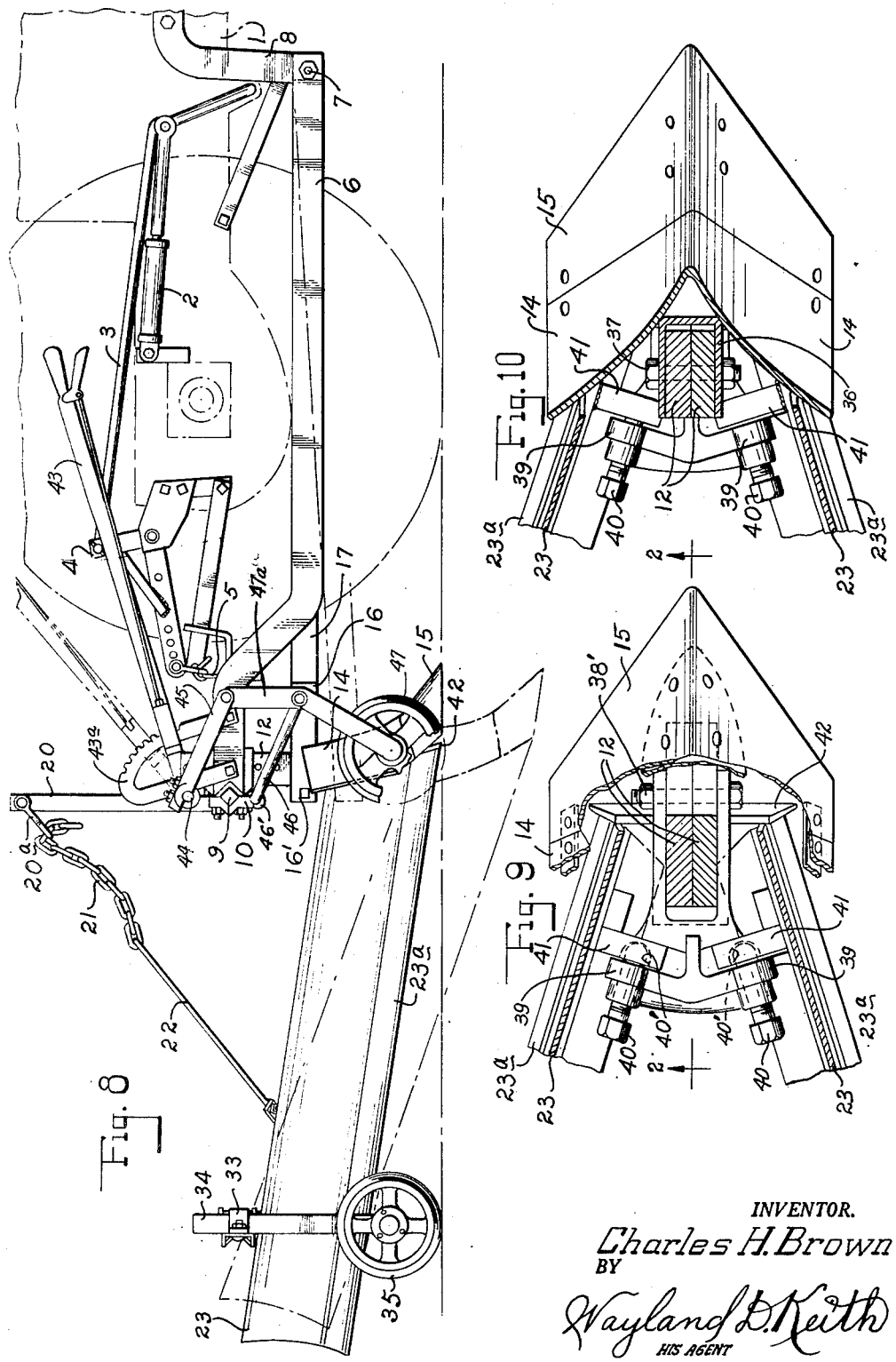
INVENTOR.
Charles H. Brown
BY
Wayland D. Keith
HIS AGENT Patented June 9, 1953

2,641,071

UNITED STATES PATENT OFFICE 2,641,071

PLOW AND MOLDBOARD ADJUSTMENT FOR DITCH DIGGING PLOWS

Charles H. Brown, Breckenridge, Tex.

Application May 19, 1948, Serial No. 27,919

3 Claims. (Cl. 37—98)

The invention relates to improvements in ditch forming implements, and more particularly to implements that may be operated behind a draft device, such as a tractor.

Various types of ditchers have been proposed heretofore, but in general these have been defective in certain respects sufficient to render them either too large, clumsy, and cumbersome for effective work, or if sufficiently small to be used in close places and with small tractors, the construction was too light to withstand the load put upon it.

An object of this invention is to improve the construction and operation of a ditcher implement, whereby the draft or line of pull is applied at a point below the axis of the draft device and intermediate the tool supporting bar thereof and the moldboard plow that initially opens the furrow for the ditching operation, so as to prevent chattering in hard dry soil.

Another object of this invention is to provide a ditching implement that is light in weight, yet, due to the construction thereof, will perform the same ditching operations as much heavier implements have done heretofore.

Another object of this invention is to provide a ditching implement composed of front and rear plow members, each of which delivers dirt out of the ditch as it is formed, thereby avoiding a crowded condition for the rear plow and saving much power while increasing the capacity of the machine.

A further object of the invention is to provide for the transmission of the draft of the tractor directly to the plow beam at a point near the top of the plow, which relieves the tool bar of all torsion strain.

In the present device, an effort has been made to make a ditcher of minimum weight, so constructed as to give a maximum strength, thereby making possible the use of a comparatively light machine to do heavy work, which would normally require a larger tractor. The present ditcher has great versatility, is readily adjustable and makes possible the forming of small or large, substantially V-shaped, ditches that are flat in the bottom.

An embodiment of this invention is illustrated in the accompanying drawings, in which:

Fig. 1 is a perspective view of the device with parts broken away and in section to bring out the details of construction, and shown attached to a tractor, which tractor is shown in dot-dash lines;

Fig. 2 is a fragmentary sectional view taken on the line 2—2 in Fig. 9;

Fig. 3 is a rear elevation of the implement shown attached to a tractor;

Fig. 4 is an enlarged fragmentary side elevation, with parts broken away and in section, and showing the moldboard ditch opening plow and the draft connection with the plow beam;

Fig. 5 is a cross section on the line 5—5 in Fig. 4;

Fig. 6 is a similar view taken on the line 6—6 in Fig. 4;

Fig. 7 is a top plan view of the device attached to a tractor, which tractor is shown in dot-dash outline;

Fig. 8 is a side elevation thereof, and with the lowered position of the device shown in dot-dash outline;

Fig. 9 is a horizontal section on the line 9—9 of Fig. 4; and

Fig. 10 is a view similar to Fig. 9, but taken on the line 10—10 of Fig. 4.

With more detailed reference to the drawings, the numeral 1 designates a conventional tractor having hydraulic power lift devices 2, each including a cylinder with a piston operating therein by hydraulic pressure. The power lift devices 2 are mounted on opposite sides of the tractor and are adapted to raise and lower implement connecting devices through the action of link bars 3 connected at one end with the power lift devices 2 and at the opposite end with bell cranks 4, which in turn are connected by chains 5 with links 6.

The links 6 are pivotally supported at their forward ends on bolts 7 mounted on support brackets 8 secured to the tractor 1, while the rear ends thereof support an implement tool bar 9, by means of clamps 10. Clamps 11 are secured to the tool bar 9 intermediate the clamps 10 and approximately on the longitudinal medial line of the tractor. The clamps 11, which are shown more in detail in Figs. 4 and 6, also embrace vertical plow beams 12. The plow beams are adjustable vertically with respect to the clamps 11, and are secured in vertically adjusted position by a bolt 13 connected with the clamps 11 and inserted selectively in holes 13' in the plow beams 12.

It is preferable to have a pair of plow beams 12 mounted in side-by-side relation and extending downwardly from the tool bar 9 and having a moldboard ditch opening plow 14 secured on the lower end thereof. The plow 14 may be provided with a removable point 15, as will be described more fully hereinafter.

Intermediate the sides of the plow 14 at the top thereof, a draft connection 16 is provided which is secured by a yoke 16' to the plow beams 12. The draft connection 16 has a link member 17 adjustably connected at one end to the front end thereof, which member 17 in turn is connected with a flexible element, such as a chain 18. The forward end of the chain 18 is connected with a bifurcated bar 19 that is connected to the bolts 7 attached to the bracket 8.

Mounted on opposite sides of the clamps 11 are upright levers 20 which are clamped to the tool bar 9, as shown in Figs. 1 and 8. These levers 20 are connected with one end of flexible elements 21, which elements may be adjusted with respect to the levers 20. Clevises 20a are provided and adjustably connected with the upper ends of the levers 20, so as to provide adjustment for the chains 21 with the levers to the various operating and transport positions.

The other ends of the flexible elements 21 are connected to links 22 which extend rearwardly and connect at the top with a pair of diverging moldboard blades 23. These moldboard blades 23 widen and form the ditch opened by the ditch opening plow 14.

The angularly diverging moldboard blades 23 have removable cutting elements 23a on the lower edges thereof, which cutting elements are formed of metal and have a comparatively short radius, which radius is tangential to the longer radius of the blades 23, as shown in Fig. 3. The cutter blade 23a is double edged and reversible and is fastened to the moldboard 23 by bolts 23b along the longitudinal center line of the cutter blade.

The moldboard blades 23 are held in spaced angularly diverging relation by a transverse bar 24 which interconnects the blades 23 by upright standards 25. The lower end of each of the standards 25 has a pivot bolt 26 (Fig. 3) extending therethrough and through lugs 27 mounted near the lower edge of each moldboard blade 23. Spaced upward therefrom and secured to the rear face of the blade 23 is a lug 28 offstanding therefrom, as shown in Fig. 3, and having spaced holes therein for selectively receiving a bolt 29 for adjustment of the moldboard blade 23 with respect to the vertical.

The upper ends of the standards 25 are mounted in clamps 30 which are secured to the transverse bar 24 by bolts 31. A series of holes 32 are provided spaced lengthwise of the transverse bar 24 for selectively receiving the bolts 31, so the clamps 30 may be adjusted at any desired point to give the correct angular divergence to the moldboard blades 23. Also secured to the transverse bar 24, near the outer ends thereof, are clamps 33, which are adapted to bindingly engage wheel support standards 34 connected with wheels 35, to make possible the correct vertical adjustment of the wheels 35, and to provide proper guiding relation of the wheels relative to the implement.

A U-shaped member 36 is fitted between the diverging wings of the plow 14, and is secured thereto by welding, as shown in Figs. 2 and 10, so as to enable the connecting of the plow 14 with the plow beams 12. Bolts 37 pass through holes in opposite sides of the member 36 which register with holes in the plow beams 12 to secure the plow 14 to the plow beams 12.

A bifurcated member 38 is pivotally connected at 38' to the plow beams 12 near the lower ends thereof, in embracing relation therewith, and extends rearwardly therefrom, as shown in Fig. 9. The member 38 is provided with lugs 39 on opposite sides thereof on a medial line passing therethrough, which lugs 39 are threaded to receive set screws 40. These set screws 40 project through lugs 39 and into recesses 40' formed in lugs 41 attached to the forward ends of the moldboard blades 23. The set screws 40 are in axial alignment with the pivot bolts 26 (Fig. 3), so that the moldboards 23 of the ditcher may swing on the bolts 26 and set screws 40 when it is necessary to make an adjustment of the blades 23 with respect to the vertical. Recesses 40' are of greater diameter than the projecting points of the screws 40 and have convex bottoms that allow of a ball and socket action in regulating the vertical adjustment of the rear ends of and the transverse vertical pitch of the moldboards.

Secured to the lower side of the bifurcated member 38 is an angle member having a downturned lip 42 (Figs. 4 and 9) forming a scraper edge, which scraper edge is substantially the width of the plow 14. It is preferable to have the down-turned lip of this member coated with a hard surfacing material so as to form a scraper blade that smooths off any undulations, and moves the loose dirt into the path of the cutter blade 23a and moldboard 23 to be delivered along with that sheared from the ditch walls to form the side levees, which will leave a ditch with a clean flat bottom substantially the width of the plow 14.

A latch lever 43, having a cooperating rack segment 43a to hold the lever in adjusted position, is mounted on a rotating shaft 44, as shown in Figs. 1 and 8. The shaft 44 supports one end of a link 45, while the corresponding end of a parallel link 46 is pivoted at 46' to a bracket on the implement bar 9. The opposite ends of the parallel links 45 and 46 are pivotally connected with a yoke 47a mounting a depth gauge wheel 47. The depth gauge wheels 47 may be raised or lowered to maintain the ditcher plow 14 at the proper depth below the ground, regardless of the condition of the terrain. The support wheels 35 on the rear portions of the ditcher blades may be adjusted vertically so as to provide the proper depth to the rear portion of the ditcher blades, or if desired, the wheels may be raised entirely free of the ground when a ditch is to be made of greater width or higher walls without changing the horizontal contour of the bottom of the ditch.

In the operation of the ditcher, the plow beams 12 are adjusted vertically in clamps 11 so that the plow 14 is set to give the proper depth to the ditch when the tool bar 9, links 6, and draft connection 16 are in their lowered positions. The draft connection 16 transmits the draft of the tractor 1 directly to plow beams 12 at a point near the top of the plow 14, which relieves the tool bar 9 of all torsional strain. This characteristic has not been present in connections of this type heretofore.

By having the draft applied to the plow beams 12 at a point below the axis of the tractor wheels, a much more stable pull is accorded and a much greater load can be pulled by the tractor with greater stability than has been possible heretofore. Because the line of pull is connected directly to the plow beam, substantially at the top of the ground, and below the axis of the tractor wheels, the tractor can pull a heavier load without chattering. The tendency to rear up is greatly diminished because the line of draft has been lowered considerably. Furthermore, due to the plow being of the suction type, the tendency is for the plow to be drawn into the ground; thus the tractor wheels are drawn downward into tighter engagement with the ground, thereby affording greater traction. After opening the first furrow, in digging deep ditches, the line of draft from the pivot bolt 7 to the plow 14, passes below the ground contact line of the rear tractor wheels. Thus a tendency of the tractor to rear up and turn over backward is entirely overcome if a ledge of stone or other subsurface obstacle should be struck by the plow.

Since the links 6 and draft members 16—19 are connected with the tractor at common pivot points 7, the entire ditcher unit, connected to implement tool bar 9, may be raised out of the ground by action of the hydraulic power lift, which comprises the parts 2—5, and since the pivot points 7 are common to both the links 6 and the members 16—19, as described above, the chain 18 will remain at substantially the same tightness, so that equal adjustment tension is transmitted to the links 6 and draft members 16—19, regardless of the depth of the plow 14 in the ground.

It is necessary to have the chains 21, that are attached to upright levers 20, slack when the machine is operating in normal ditching position. This allows the lifting of the plow 14 substantially clear of the ground before the chains 21 become sufficiently tight to lift the moldboard blades 23 out of the ditch.

This two stage action also alleviates the disposition of the tractor to rear upward.

The moldboard blades 23 are connected forward of the rear of the moldboard plow 14, so the blades 23 will receive the dirt thereon outwardly from the scraper 42, carrying it along with that cut from the sides of the ditch and distributing it with that just previously thrown upward by the moldboard plow 14. The moldboard plow 14 and point 15 are so constructed as to have the peculiar characteristic of causing the dirt to move spirally upward and be thrown out on each side of the plow leaving it temporarily resting on the edge of the vertically sided ditch just cut. The moldboard blades 23 receive this dirt and combine it with that being cut along the sides of the ditch, dividing it and delivering it to each side of the ditch, thereby forming the levees on the V-shaped ditch being opened, with a clean flat bottom. The plow point 15 is constructed so as to form an obtuse angle of approximately 135° at the juncture thereof with the plow 14. The main moldboard portion of the plow 14 is deformed in such manner that the upper portion thereof forms an angle of approximately 90° between the lateral deflecting sides thereof and extends substantially vertical, as shown in Figs. 1, 4 and 8.

With the plow 14 and the point 15 thereon adjusted for operation so that the entire lower edge of the point 15 operates substantially horizontal to the surface that it cuts, a ditch will be formed that is substantially flat at the bottom for a width approximately the width of the plow. Loose dirt, therefore, will not remain in the bottom of the ditch to be caught up by the water and carried along to be deposited at any sag in the ditch bottom and build up the bottom of the ditch and cause the water to break over the sides thereof whether it be for irrigation or drainage. It is desirable, therefore, to form clean ditches with flat bottoms and with the side walls diverging upwardly therefrom.

In order to free the bottom of the ditch from loose dirt and irregularities, a scraper blade, in the form of the downturned lip 42, is provided to extend transversely of the ditch in the path of any dirt that may pass around the edges of the plow point 15. The lower edge of the lip 42 is so positioned as to sweep the dirt from the ditch and direct it ahead of the moldboards 23, the forward ends of which are within the length of the lip 42, as shown in Fig. 9.

With the plow point 15 adjusted upwardly or downwardly in such manner as to form a ditch substantially of V-shape with a flat bottom, and with the scraper blade or lip 42 arranged to remove the irregularities from the bottom thereof and to direct any loose dirt ahead of the moldboards 23 to be carried up and removed from the ditch, the entire ditching operation can be completed at one operation with a single effective and compact machine.

It will be appreciated that the draft members 16—19 apply the draft pull to the plow beams 12 in such manner as to pull the plow beams forward. The tool bar 9 sustains the upper end of plow beams against forward movement of the tool bar 9. The forward push of the upper end of the plow beam is transmitted in compression to the links 6. By having the pull located in this manner the chattering and vibration that usually is inherent in such connections in which the plow beams extend a substantial distance below the tool bar is eliminated. The functions left for the tool bar 9 are to maintain the top of the plow beams in aligned positions with the line of travel, and properly vertical by means of the clamps 11, and to prevent any tendency for chattering of the plow by preventing torsional movement around the point represented by the clamps 16 fastened approximately midway of the plow beams.

It is to be appreciated that in machines of this general character, as constructed heretofore, the draw bar would have sustained the pull of the load and would have been in tension.

In the present arrangement, the draft from the tractor is applied through draft members 16—19, to the plow beams 12 at a point near the top of the ground, when the plow is engaged in ditching operations. The upper ends of the plow beams 12 are restrained against forward movement by the tool bar 9. The tool bar, in turn, is held against forward movement by link members 6 which are interconnected with the tractor by the bolts 7 at points common to the connection of the draft members 16—19. By transmitting the pull to the plow beams at a point near the top of the ground, and restraining the top of the plow beams against forward movement, the pull on the plow is such as to give a non-chattering movement.

The members used on implements heretofore that were comparable to the members 6 of the present implement, were used as tension members when clamped to the tool bar, with a plow beam clamped at approximately right angles thereto and protruding eighteen or more inches therefrom. With a plow attached thereto, it can be appreciated readily that, when the plow was engaged in the ground, a vibratory or chattering action was accorded thereto, as the bar 9 was a torsion member. However, with the present construction, the tool bar 9 and clamps 11 are relieved of rearward bending and twisting strain, except that necessary to lift the ditcher moldboards and their appurtenances, when they are removed from the ground.

It is to be understood that, while the implement has been illustrated and described in one embodiment thereof, alterations and changes may be made in the construction without departing from the appended claims.

I claim:

1. In a ditch forming implement adapted to be attached to a tractor, the combination of an earth opening plow having diverging sides, a pair of moldboard blades projecting outwardly from the plow in diverging relation, a bifurcated member, means pivotally connecting said member with the plow, said member having laterally projecting lugs on opposite sides thereof, lugs attached to the blades and extending inwardly in overlapping relation with the first-mentioned lugs and having recesses therein, and screws threaded through the first-mentioned lugs and engaged in said recesses adjustably and pivotally securing the blades to the member.

2. In a ditch forming implement adapted to be attached to a tractor, the combination of an earth opening plow having diverging sides, a pair of moldboard blades projecting outwardly from the plow in diverging relation, a bifurcated member, means pivotally connecting said member with the plow, said member having laterally projecting lugs on opposite sides thereof, lugs attached to the blades and extending inwardly in overlapping relation with the first-mentioned lugs and having recesses therein, screws threaded through the first-mentioned lugs and engaged in said recesses adjustably and pivotally securing the blades to the member, and supporting structure including pivot means connected at the opposite ends of the moldboard blades on axes in alignment with the axes of the screws.

3. In a ditch forming implement adapted to be attached to a tractor, the combination of an earth opening plow having diverging sides, a pair of moldboard blades projecting outwardly from the plow in diverging relation, a U-shaped member fixed between the sides of the plow, a plow beam extending through said U-shaped member, a pivot connecting the plow beam with said U-shaped member, a bifurcated member, means pivotally connecting said bifurcated member with the beam, said bifurcated member having laterally projecting lugs on opposite sides thereof, lugs attached to the blades and extending inwardly in overlapping relation with the first-mentioned lugs and having recesses therein, and screws threaded through the first-mentioned lugs and engaged in said recesses adjustable and pivotally securing the blades to the bifurcated member.

CHARLES H. BROWN.

References Cited in the file of this patent

UNITED STATES PATENTS

| Number | Name | Date |
|---|---|---|
| Re. 20,990 | Wright | Jan. 24, 1939 |
| 65,847 | Warren | June 18, 1867 |
| 757,998 | Davis | Apr. 19, 1904 |
| 935,288 | Witter | Sept. 28, 1909 |
| 1,233,874 | Hamilton | July 17, 1917 |
| 1,360,409 | Johnson | Nov. 30, 1920 |
| 2,297,301 | Hipple | Sept. 29, 1942 |
| 2,311,551 | Laird | Feb. 16, 1943 |
| 2,320,855 | Dukes | June 1, 1943 |
| 2,375,026 | Mott | May 1, 1945 |

FOREIGN PATENTS

| Number | Country | Date |
|---|---|---|
| 434,444 | Germany | Sept. 25, 1926 |
| 349,217 | Great Britain | May 28, 1931 |